United States Patent [19]
Le

[11] Patent Number: 5,549,829
[45] Date of Patent: Aug. 27, 1996

[54] MEMBRANE FILTRATION SYSTEM

[75] Inventor: Minh Son Le, Cheshire, United Kingdom

[73] Assignee: Northwest Water Group PLC, United Kingdom

[21] Appl. No.: 367,176
[22] PCT Filed: Jun. 30, 1993
[86] PCT No.: PCT/GB93/01379
§ 371 Date: May 22, 1995
§ 102(e) Date: May 22, 1995
[87] PCT Pub. No.: WO94/01207
PCT Pub. Date: Jan. 20, 1994

[30] Foreign Application Priority Data

Jul. 1, 1992 [GB] United Kingdom ............ 9214037

[51] Int. Cl.$^6$ ................................ B01D 61/58
[52] U.S. Cl. ............... 210/636; 210/641; 210/500.23
[58] Field of Search .......................... 210/626, 641, 210/500.23, 259

[56] References Cited

U.S. PATENT DOCUMENTS 3,457,170  7/1969  Havishs .................... 210/644
4,160,726  7/1979  DelPico .

FOREIGN PATENT DOCUMENTS 0055839  7/1982  European Pat. Off. .
59-179110  10/1984  Japan .
61-181504  8/1986  Japan .

OTHER PUBLICATIONS

Concentration Polarization With Membrane Ultrafiltration; Ind. Eng. Chem. Prod. Res. Develop. vol. 11, No. 3. (1972).
Ultrafiltration Applications; Desalination, 77 (1990) 135–179; Elsevier Science Publishers B.V.

*Primary Examiner*—Frank Spear
*Attorney, Agent, or Firm*—Michael, Best & Friedrich

[57] ABSTRACT

An apparatus for producing a high solids content aqueous dispersion from a low solids content aqueous dispersion, for example waste water containing dilute emulsion paint. At least two membranes are arranged in series, a first membrane being of hollow fibre structure with a bore diameter greater than 1 mm and a pore size of less than 3,000 Kilodaltons molecular weight cut off, and a second tubular membrane being of bore diameter less than 50 mm and pore size of less than 3,000 Kilodaltons molecular weight cut off. The low solids content dispersion is passed across a face of the first membrane at a cross flow velocity of from 0.5 to 5.0 meters per second, a differential pressure being applied to force liquid through the membrane. The resultant retentate has an intermediate solids content and is passed across a face of the tubular membrane at a cross flow velocity of from 0.5 to 5.0 meters per second. A differential pressure is applied across the tubular membrane to force liquid therethrough. The resultant retentate is of high solids content, for example greater than 40% solids content given a starting dispersion of from up to 5% solids content.

26 Claims, 1 Drawing Sheet

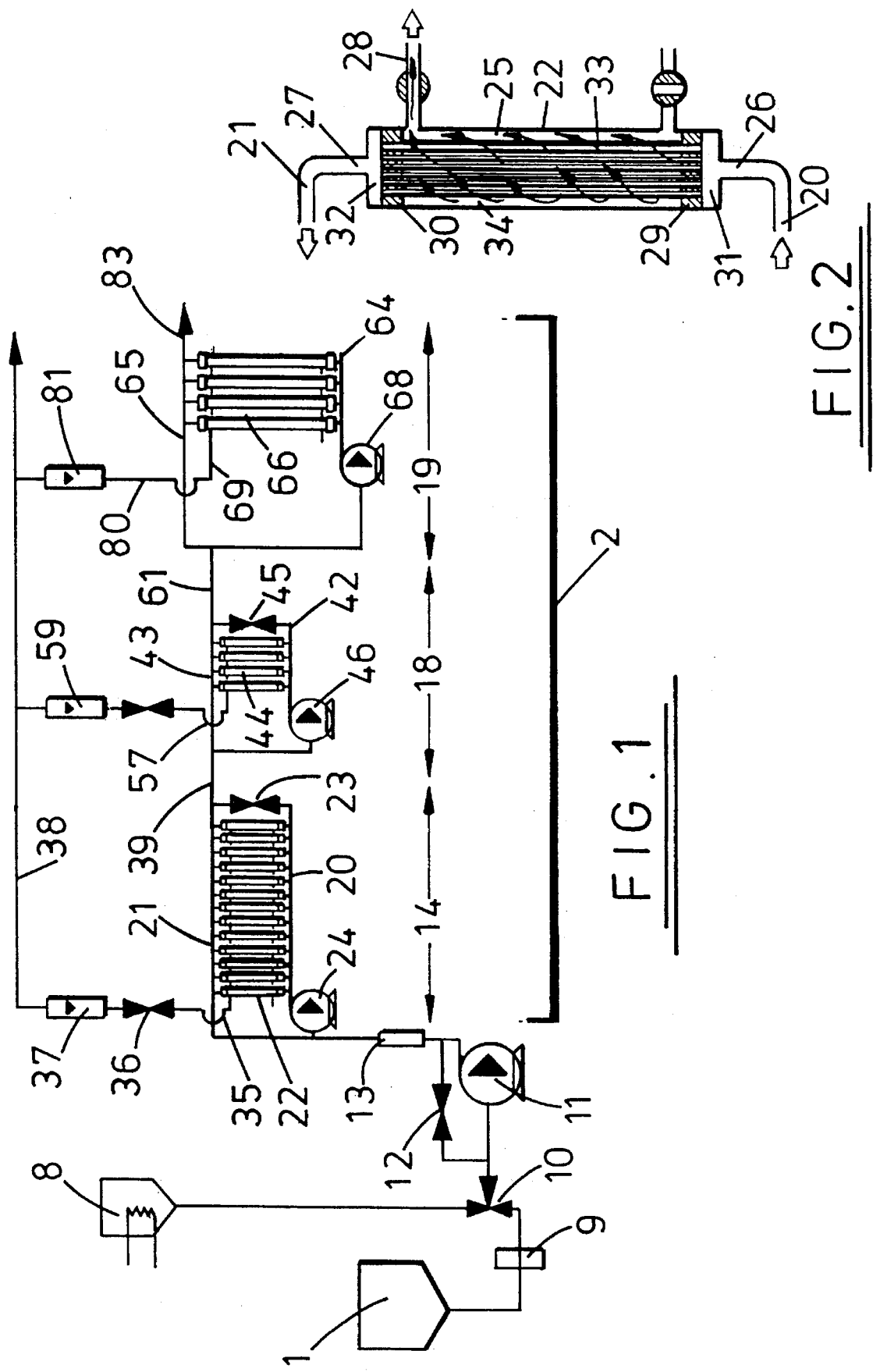

MEMBRANE FILTRATION SYSTEM

The present invention relates to an apparatus and process for producing a high solids content aqueous dispersion from a low solid content aqueous dispersion. The invention is particularly concerned with producing a high solids content dispersion from a low solids content dispersion or emulsion incorporating polymer latex.

Many products are manufactured in batches, and where such products are likely to undergo physical or chemical changes over time, or cross-contamination between batches is unacceptable, it is often necessary to clean the manufacturing equipment before working on a new batch. The cleaning operation usually involves the generation of a volume of waste water which must then be disposed of. The manufacture of emulsion paints is a typical example of such batch processes.

In the case of paint processing, valuable raw materials are lost in the waste water. Furthermore, the waste water has an extremely high polluting potential which precludes its discharge into waterways without appropriate treatment. Traditionally, it has been a common practice to transport such wastes to a landfill site for dumping. This in itself entails significant costs. Even this approach to the problem of waste water disposal is becoming unacceptable however as a result of concerns over the environment, particularly the conservation of water resources, and the growing scarcity of suitable landfill sites.

Ultrafiltration has been used in many industries for different applications, for example the concentration of milk, the clarification of fruit juices, the recovery of paint including resin from electrocoating paint tanks and the like. In the past, some paint manufacturers have investigated the use of membranes for the concentration of dilute emulsion paints. Their attempts largely failed, however, because they were only able to concentrate the waste water to about 25% total solids content on a dry weight basis. It would be necessary to use an evaporator to further concentrate the waste water to the desired solid content level of over 40%, that being the solid content level at which the retentate can be used for example in the manufacture of a subsequent batch of the same paint. In addition to the problem of obtaining adequate concentrations, it was also found that the membranes could not be maintained in a clean condition.

Membranes are thin polymeric films defining pores, the pore size determining the separation, that is which materials the membrane will pass and which materials the membrane will retain. Membranes are available in a variety of forms, for example spiral wound, hollow fibre, plate and frame and tubular. The present invention is concerned with the application of hollow fibre membranes and tubular membranes.

The term "hollow fibre membrane" is used in this document to denote a membrane comprising a relatively thick open-pored tubular support structure and a relatively thin surface layer defining pores which determine the pore size of the membrane, the support structure and surface layer being formed from the same material in a single manufacturing step. Hollow fibre membranes can be manufactured to have relatively small diameters, for example internal diameters as small as 1 mm, but cannot withstand large differentials between internal and external pressures.

The term "tubular membrane" is used in this document to denote a membrane comprising a porous tubular support structure of a first material on a surface of which is deposited a layer of a second material, the surface layer of the second material defining pores which determine the pore size of the membrane. The support structure of a tubular membrane can be manufactured from a material which gives high strength and can thus resist large pressure differentials, but it is difficult to manufacture tubular membranes of small internal diameter.

In the case of both hollow fibre and tubular membranes, in use the dispersion to be concentrated is passed at a relatively high velocity across the membrane surface so that any solid deposited on the membrane surface is swept away. This keeps the membrane surface relatively clean although periodic cleaning of the membrane is nevertheless necessary. In practice, the interactions between materials to be separated and a membrane cannot be predicted simply on the basis of particle size of the materials to be separated and the pore size of the membrane. This is because some materials when coming into contact with certain types of membranes bind very tightly to the membrane surface despite attempts to sweep the membrane clear by using a high cross-flow velocity. When this occurs the effective pore size is reduced and in some cases all of the pores in a membrane may be blocked so that the membrane is rendered useless. Emulsion paints by design have a propensity to cover and bind strongly to surfaces and therefore present particular problems to the designers of ultrafiltration membrane systems.

The type and dimensions of membranes to be employed are also critical factors. It is known that the geometry and dimensions of flow channels in ultrafiltration membrane systems relying upon tubular flow channels determine the shear rates or the sweeping action on the membrane surface for a given dispersion velocity. The velocity is determined by the pressure drop along the length of a flow channel through a membrane and this pressure drop itself is dictated by pump pressure and liquid viscosity. Unfortunately, emulsion paints do not have a constant viscosity. The paint viscosity is dependent on temperature, the shear history it has experienced, and the shear rates it is being subjected to as well as the proportion of thixotropic additive and thickeners in its formulation. The additives and thickeners themselves are subject to degradation by biological actions and the passage of time. Thus with a complex material like a paint emulsion the shear regime which would be ideal for any particular membrane system cannot be determined from any mathematical principle. Indeed, the requirements of the membrane system are made even more difficult to meet because it can be necessary to process waste water including emulsion paint having a wide range of solid concentrations, for example from 0.2% to more than 40% dry weight.

A further problem which arises with emulsion paints is the fact that the solids in emulsion paints consist of a high proportion of titanium oxide. Particles of titanium dioxide are extremely abrasive and pump wear, particularly on seals, can result in costly pump failures. Traditionally, air driven diaphragm pumps have been used for paint transfer, because such pumps do not rely on any seals. Unfortunately, conventional diaphragm pumps generally do not generate very high pressures or high flow rates, cause pulsing, and are not well suited for prolonged pumping duties.

A typical specification for a treatment plant to handle waste water produced by a paint manufacturer would require the treatment of up to 3,000 cubic meters per annum of waste water incorporating from 2 to 5% solid with the approximate composition of those solids being latex 30%, titanium dioxide 30%, other powders 38% and thickeners the balance. The "other powders" would generally include for example china clay/calcium carbonate. Organic solvents may be present in small quantities in the starting material and could amount from 1 to 2% of the recycled water. The starting material could also contain varying proportions of ethylene glycol, benzyl alcohol, white spirit and texanol. There would also be small quantities of surfactants, biocides and the like. Clearly with such a complex starting material extreme care has to be taken in the design of the processing plant.

U.S. Pat. No. 4,160,726 describes an ultrafiltration process for the concentration of polymeric latices, and in particular latex. This is a simple material to concentrate by ultrafiltration as compared with emulsion paints. U.S. Pat. No. 4,160,726 proposes the addition of surfactants to the dispersion to be concentrated so as to reduce the tendency of the latex to coagulate. It is stated that latex concentration can be achieved using a single semi-permeable tubular membrane unit, or a series of such units arranged to progressively concentrate the latex as it passes through each membrane device. Such an approach to the processing of emulsion paints would simply not produce acceptable results. Concentration of water containing emulsion paint to a concentration level of 40% solids content or more transforms the material from a free running liquid to a material having a consistency like toothpaste, that is a viscosity of the order of 10,000 cP. It is not sufficient simply to maintain flow rates at a sufficiently high level to avoid the development of a polarised boundary layer. This may be appreciated by reference to the article "Concentration Polarization with Membrane Ultrafiltration", pages 234–248 of Ind.Eng.Chem.Prod.Res.Develop., Volume 11, No. 3, 1972. That document clearly discloses the ultrafiltration of latex in a manner which relies upon either laminar or turbulent flow to prevent polarised boundary layer formation. Despite the fact that this knowledge of the importance of dispersion velocity in the design of ultrafiltration systems has been available for many years, no practical ultrafiltration system for processing waste water containing emulsion paints has been established.

It is an object of the present invention to obviate or mitigate the problems outlined above.

According to the present invention, there is provided a process for producing a high solids content aqueous dispersion from a low solids content aqueous dispersion having a solids content of up to 5%, wherein the low solids content aqueous dispersion is passed across a face of a hollow fibre membrane of bore diameter greater than 1 mm at a cross flow velocity in the range of 0.5 to 5.0 m/s, and a pressure differential is applied across the hollow fibre membrane so as to force liquid from the low solids content dispersion through the membrane and to form as a retentate an aqueous dispersion of intermediate solids content, and wherein the intermediate solids content dispersion is passed across a face of a tubular membrane of bore diameter greater than that of the hollow fibre membrane but less than 50 mm at a cross flow velocity in the range of 0.5 to 5.0 m/s and a pressure differential is applied across the tubular membrane so as to force liquid from the intermediate solids content dispersion through the tubular membrane and to form as a retentate the aqueous solution of high solids content having a solids content of at least 20%, the hollow fibre membrane and tubular membrane having pore sizes of less than 3,000 Kilodaltons molecular weight cut off.

The present invention also provides an apparatus for producing a high solids content aqueous dispersion from a low solids content aqueous dispersion, comprising a hollow fibre membrane of bore diameter greater than 1 mm and pore size of less than 3,000 Kilodaltons molecular weight cut off, means for passing a low solids content dispersion across a face of the hollow fibre membrane at a cross flow velocity of from 0.5 to 5.0 m/s, means for applying a pressure differential across the hollow fibre membrane so as to force liquid through the membrane from a low solids content dispersion passing the membrane to form a retentate of intermediate solids content, a tubular membrane of bore diameter less than 50 mm and pore size of less than 3,000 kilodaltons molecular weight cut off, means for passing the retentate from the hollow fibre membrane across a face of the tubular membrane at a cross flow velocity of from 0.5 to 5.0 m/s, and means for applying a pressure differential across the tubular membrane so as to force liquid from an intermediate solids content dispersion passing the tubular membrane to form a retentate of high solids content.

It has been found that systems as defined above are capable of reliably concentrating complex emulsions such as emulsion paints. It will be appreciated, however, that the above systems can also be applied to the concentration of less complex emulsions, for example water contaminated with 100 ppm oil, on to the concentration of milk, the clarification of fruit juice, and to the recovery of surface coatings from electrocoating paint tanks.

The present invention enables the process variables to be so controlled that, starting with a feed of very dilute aqueous surface coating waste, typically up to 5% dry weight of solids, a dispersion of at least 40% dry weight of solids may be produced, the aqueous permeate being substantially free from turbidity. In other uses, for example milk concentration and fruit juice clarification, the starting concentration of solids may be significantly higher or lower, but the desired end concentration may be the same.

The system in accordance with the present invention is safe to operate and provides a high level of convenience and economy of use. The membrane system process variables are designed for continuous operation, and the system may be very compact. The membrane system may be self-contained, and thus readily connected to a relevant process feed tank and site services without complicated site preparation and with minimum disruption to the associated process. The membrane system may be skid mounted for easy transport, skid sizes being selected to suit the size of the system components. The scale of the membrane system can be selected to suit the particular application.

Membranes with pore sizes less than 3,000 Kilodaltons molecular weight cut-off (MWCO) are suitable for providing an effective separation in the case for example of typical emulsion paints. However, membranes with pore sizes towards the bottom end of this range tend to require excessively high pressure differentials across the membrane to produce a commercially satisfactory flux.

Membrane pore sizes of 60 Kilodaltons MWCO have proved suitable for the treatment of water contaminated with emulsion paint. The appropriate pore size, however, depends largely on the particular application of the system. For example, the treatment of water contaminated with low concentrations of dispersed oil may require a different pore size from for example that which is useful in producing a high solids content dispersion of surface coating waste. The preferred membrane pore size for emulsion paint filtration is in the range of 50 to 100 Kilodaltons MWCO.

Preferably the hollow fibre membrane comprises two stages, that is first and second hollow fibre membrane modules connected in series, the low solids content dispersion delivered to the first module being recirculated through that module until a desired solids content is achieved, whereupon the partially concentrated dispersion is delivered to the second module. Where the low solids content dispersion to be processed is in the form of an emulsion paint slurry having up to 5% solids content, the retentate from the first module which is delivered to the second module has a solids content of from 10 to 15%, and the retentate from the second module which is delivered to the tubular membrane has a solids content of from 20% to 30%. By appropriate control of the process parameters, the solids content at the inlet to the tubular membrane may be controlled such that it will not deviate by more than 0.5%. This results in a more predictable concentrate quality.

The membrane may have any structure and be of any material which has sufficiently high strength to withstand liquid or gaseous pressures applied thereto and which is compatible with other operational parameters, such as pore sizes, adequate resistance to the chemical environment, and resistance to fouling in that environment. Typically hollow fibre membranes are operated at inlet pressures of from 1 to 3 barg, and tubular membranes are operated at inlet pressures of from 3 to 18 barg. Tubular membranes may be operated at higher pressures than hollow fibres because they incorporate a support structure distinct from the material defining the membrane itself. The support structure may be in the form of extruded thermoplastics or stainless steel porous tubes.

Suitable membranes for use for paint filtration include membranes based on polyarylsulphone, polyarylethersulphone, polyvinylidine fluoride or polyaryletherketone, or ceramic, such as zirconia, the latter being less preferred on the grounds of cost. Polysulphone membranes are particularly preferred for their high chemical resistance, for example those of the polysulphone UDEL or the polyarylethersulphone PES. Such membranes are further defined below and are capable of being manufactured with the pore sizes required for the present invention.

Membranes based on polypropylene should be avoided for paint filtration since they are prone to fouling in that environment and are difficult to clean. Unsuitable membranes for the present process when used for paint filtration (since they have inadequate resistance to the chemical environment in the process) include membranes based on cellulosics, polyamides, acrylics and polyvinylchloride.

As examples of polymers of which the membrane may be made are inter alia polymers and copolymers of units of the general formulae I-VII.

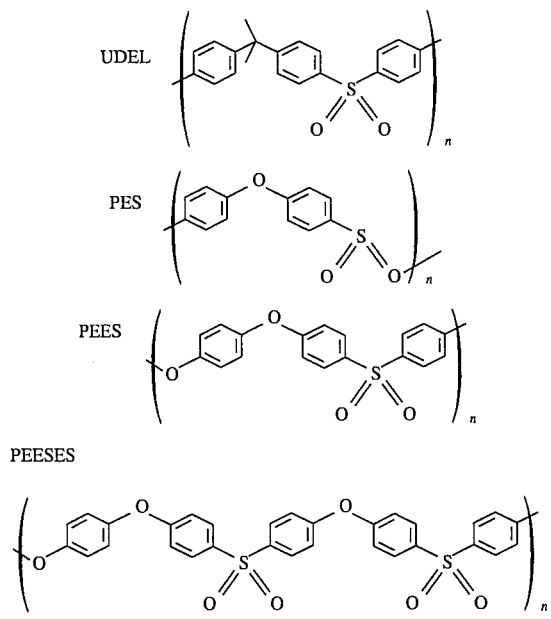

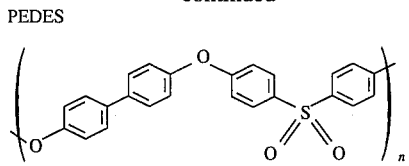

Whereas the polymer is preferably a homopolymer, e.g. UDEL or PES, we do not exclude the possibility that it may be a copolymer e.g. PEES/PES, or one wherein the copolymer units are represented by the following formulae:

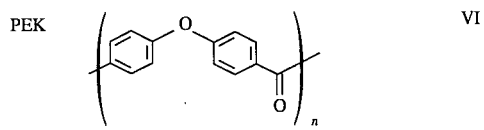

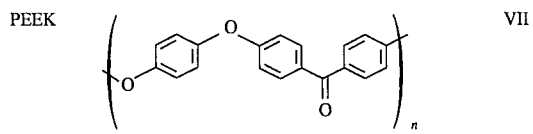

It is important to maintain a high shear rate of a paint emulsion being treated over the working surface of the membrane to minimise the paint viscosity and to ensure that the membrane surface is swept clean so as to prevent the build-up of a polarised boundary layer. With this is mind it is advantageous to use hollow fibre and tubular membranes defining cylindrical flow channels which tend to produce a uniform shear regime. Flow channels which are not cylindrical may, however, provide acceptable results. References to the bore size of flow channels in this document correspond to the diameter of cylindrical structures and the mean diameter of non-cylindrical structures.

The concentrate stream emerging from the membrane system of the present invention when it is used to treat paint emulsions will have a solids content in excess of 40% which yields a viscosity of the order of 10,000 cP. Despite this high viscosity, it is nevertheless possible to achieve the necessary shear rates in accordance with the present invention by appropriate design of the pumping systems and the membrane structures. Preferably the hollow fibre membrane has a bore of from 1 to 4 mm and a cross flow velocity therein of from 0.5 to 1.5 meters per second. Preferably the tubular membrane has a bore size of from 6 to 25 mm and a cross flow velocity of from 3 to 5 meters per second.

The capacity of a filter unit in accordance with the present invention will normally be determined by the volumetric flow rate and the solids concentration of the stream to be handled, but in general each system will be sized to handle from 1 to 50 cubic meters per day. For larger process flow rates, further membrane modules may be added in parallel, or a plurality of complete membrane systems may be used in parallel.

Typically each membrane in the system of the present invention will have a total membrane area of from 0.1 to 10 square meters, for example 1 to 2.5 square meters, and will be made of an inert material such as polysulphone, PVC or stainless steel. Typically each hollow fibre membrane will be in the form of a cylindrical module having a length of from 100 mm to 2 meters, for example 300 mm to 1 meter, and a diameter of 10 mm to 500 mm. Such a module will contain from 50 to 7,000, for example 150 to 2,000 fibres.

Each tubular membrane may be in the form of a cylindrical module with a length of from 300 mm to 5 meters, for example 1 to 3 meters, and a diameter of from 10 mm to 1 meter, the cylindrical structure containing from 2 to 200, for example from 5 to 20 tubes.

Preferably a centrifugal pump is arranged to pump dispersion across the face of the hollow fibre membrane and a positive displacement pump is arranged to pump dispersion across the face of the tubular membrane.

An embodiment of the present invention will now be described, by way of example, with reference to the accompanying drawings, in which:

FIG. 1 is a schematic illustration of an apparatus in accordance with the present invention which incorporates three membrane stages; and FIG. 2 is a schematic illustration of a hollow fibre membrane module which is incorporated in two of the stages of the apparatus described with reference to FIG. 1.

The apparatus for the present invention depicted in FIG. 1 consists of a stock feed tank 1 connected via a feed pipe assembly which includes a screen filter 9, a three-way valve 10, a centrifugal feed pump 11, a bypass feed valve 12 and a flow meter 13, to a first inlet manifold 20 of a first stage 14 of the ultrafiltration unit 2. The apparatus is untended to process waste incorporating from 2 to 5% solids content.

Within the first stage 14 of the unit 2, the first inlet manifold 20 is connected to a first outlet manifold 21 by thirteen first hollow fibre membrane modules 22 containing a total of 31 m$^2$ of hollow fibre membranes, a first module bypass valve 23, and a first centrifugal recirculating pump 24.

FIG. 2 illustrates one of the modules 22. Within each hollow fibre membrane module 22 a chamber 25 is defined which has an inlet port 26 communicating with the first inlet manifold 20 of the first stage 14 of the unit 2, an outlet port 27 communicating with the first outlet manifold 21, a permeate outlet port 28 lying between the inlet port 26 and outlet port 27, and a plurality of parallel elongate hollow fibre membranes 33 mounted in the module 22 to run from the inlet port 26 to the outlet port 27.

The fibre membranes 33 are held at their ends by bodies of potting material 29, 30, each of which extends and adheres to the walls of the chamber 25 and defines a first inlet chamber 31 adjacent to the inlet port 26, a first outlet chamber 32, and a first permeate chamber 34 therebetween.

The permeate outlet port 28 of each hollow fibre membrane module 22 communicates with a first permeate outlet manifold 35 (FIG. 1) which is connected via a first permeate outlet valve 36 and first permeate outlet flowmeter 37 to a permeate outlet line 38. The first inlet manifold 20 of the first stage 14 of the unit 2, is also connected to a first transfer pipe 39. The first transfer pipe 39 is connected in turn to a second inlet manifold 42 in the second stage 18.

Within the second stage 18 of the unit 2, the second inlet manifold 42 is connected to a second outlet manifold 43 by four second hollow fibre membrane modules 44 containing in total 9.6 m$^2$ of hollow fibre membranes, a second module bypass valve 45 and a second centrifugal recirculating pump 46.

Within each second hollow fibre membrane module 44 (not shown), analogously to each first module 22, there is a chamber with an inlet port, an outlet port, a permeate outlet port, and a plurality of parallel elongate hollow fibre membranes held in the module by means of bodies of potting material, a second inlet chamber, a second outlet chamber, and a second permeate chamber.

The permeate outlet port of each second hollow fibre membrane module 44 communicates with a second permeate outlet manifold 57, which is connected via a second permeate outlet valve 58 and second permeate outlet flowmeter 59 to the permeate outlet line 38.

The second inlet manifold 42 of the second stage 18 of the unit 2, is also connected via a second transfer pipe 61 to a third inlet manifold 64.

Within the third stage 19 of the unit 2, the third inlet manifold 64 is connected to a third outlet manifold 65 by four tubular membrane modules 66 containing a total of 10.8 m$^2$ of tubular membrane, and a third peristaltic recirculating pump 68. Within each tubular membrane module 66, analogously to each first hollow fibre membrane module 22, there is a chamber with an inlet port, an outlet port, a third permeate outlet port, a plurality of parallel elongate tubular membranes held in the module, a third inlet chamber, a third outlet chamber, and a third permeate chamber.

The third permeate outlet port communicates from the third permeate chamber with a third permeate outlet manifold 69, which is connected via a third permeate outlet flowmeter 81 to the permeate outlet line 38.

The third outlet manifold 65 runs into a concentrate outlet pipe 83, the outlet of which may be run into the feedstock tank 1, a drain, a storage tank or back into the process producing the treated effluent.

In the illustrated system, the fibres in modules 22 and 24 had a bore diameter of 1.1 mm, whereas the tubular membranes in module 66 had a bore diameter of 12.7 mm.

At the front end, the membrane system is provided with a 200 liter electrically heatable cleaning tank 8 connected to the second inlet of the three-way valve 10 which is used for the heating and supply of cleaning solution for a conventional periodic cleaning of the membrane module 22, 44 and 66 of the ultrafiltration unit 2.

Cleaning is necessary because, as filtration takes place, the membrane becomes progressively obstructed by the accumulation and compaction of a fouling layer on its surface, resulting in a decline in the rate of filtration. The rejection characteristics of the membrane may also be affected. The net result of fouling is a reduction in the plant throughput capacity with a possible reduction in the product quality. To overcome such problems the operation of the membrane plant is regularly interrupted for cleaning.

Membrane cleaning is carried out in situ by first flushing the membrane with the permeate or water, followed by the perfusion of the cleaning solution. Finally, the membrane is again flushed with the permeate or water before going back on duty. Typically, the cleaning cycle takes 2–3 hours and is performed about once a week, or once a day in case of severe fouling.

As regards the operation of the membrane system, the stock feed tank 1 should have the capacity of 2 days' effluant flow from the plant which it is desired to treat, to insulate the membrane system from any input fluctuation, and to provide an operational margin for the plant when the membrane system is taken out of commission.

At start up in operation, the membrane system is purged with water drawn from the cleaning tank 8 by the stock feed pump 11 and recirculated by the recirculation pumps 24, 45 and 48, to remove any trapped air.

Subsequently, the feed fluid is added to the stock feed tank 1, from where it is drawn through the three-way valve 10 and screen filter 9 by the feed pump 11. The screen filter 9 prevents the ingress of larger particles in the feed fluid which could damage or clog the pumps 11, 24, 46, 68, or the membrane modules of the ultrafiltration unit 2.

The feed fluid is then delivered by the feed pump 11 to the first hollow fibre membrane modules 22.

The membrane system throughput is set by the stock feed pump 11 and the bypass feed valve 12, and may be read off on the flow meter 13.

In the first stage 14 of the unit 2 the feed is recirculated through the interior of the first hollow fibre membranes 33 in the modules 22 by means of the first recirculating pump 24 until it reaches the desired concentration, typically between 10 and 15% solids. The partially concentrated feed is then delivered to the second hollow fibre membrane modules 44 of the second stage 18 of the unit 2.

The settings of the first module bypass valve 23, the first recirculating pump 24 and the first permeate outlet valve 36 of the first stage 14 of the unit 2, determine the velocity of the feed through the first hollow fibre membranes 33, the balance between feed that is recycled through the first hollow fibre membrane modules 22 and what is transferred via the first transfer pipe 39 to the second inlet manifold 42 in the second stage 18, and hence the average number of recycles of the feed before such transfer.

In the second stage 18 of the unit 2 the concentrated feed is similarly recirculated through the interior of the second hollow fibre modules 44 by means of the second recirculating pump 46, until it has typically 20 to 25% solids content. The concentrate output of the second stage 18 is then displaced to the tubular membrane modules 66 of the third stage 19 of the unit 2.

Again, the settings of the second module bypass valve 45, the second recirculating pump 46 and the second permeate outlet valve 58 of the second stage 18 of the unit 2, determine the velocity of the feed through the second hollow fibre membranes, the balance between feed that is recycled through the second hollow fibre membrane modules 44 and what is transferred via the second transfer pipe 61 to the third inlet manifold 64. These settings hence also determine the average number of recycles of the feed before such transfer.

In the third stage 19 of the unit 2, the concentrate is recirculated through the interior of the tubular membrane modules 66 by means of the third recirculating pump 68, until it has in excess of 40% solids content. The concentrate then runs into the concentrate outlet pipe 83, the outlet of which may be run into the feedstock tank 1, a storage tank and/or back into the process producing the treated effluent.

The setting of the third recirculating pump 68 in the third stage 19 of the unit Z, determines the velocity of the concentrate through the tubular membranes, the balance between concentrate that is recycled through the tubular membrane modules 66 and what is transferred via the concentrate outlet pipe 83, and hence the average number of recycles of the concentrate before such transfer.

In the illustrated system, the cross flow velocities through the modules 22, 44 and 66 were 1.5 m/s, 0.75 m/s and 3.0 m/s respectively. The inlet pressures to the modules 22 and 44 were in the range 1.5 to 1.8 barg, and the inlet pressure to the module 66 was in the range 8 to 9 barg. The pressure range of 8 to 9 bar was used successfully with a peristaltic pump. It may be possible however to replace the peristaltic pump with a centrifugal pump working at 4 to 5 bar or another positive displacement pump working at 15 to 18 bar.

Permeate passing through the membranes of the membrane modules 22, 44, 66 into the respective permeate chambers is collected in the permeate outlet line 38, from where it may be run to the drains or a storage tank, or the permeate may be recycled to the factory for vessel and equipment cleaning.

The overall degree of concentration of the throughput stream is controlled by adjusting the rate of aqueous vehicle removal from the first and second stages and by controlling the recirculation of the disperson through the third stage.

The paint concentrate produced by the described embodiment of the present process is of a suitable quality for re-use in a paint formulation. Although the described embodiment has three stages, it will be appreciated that systems could have two or four or more stages. Generally speaking, the larger the volume of material to be processed, and the lower the initial solids content of that material, the greater will be the number of stages. For example, in the system described with reference to the drawings, if the minimum initial solids content had been 0.2%, rather than 2%, it might have been appropriate to provide a third hollow fibre membrane module stage.

I claim:

1. A process for producing a high solids content aqueous dispersion from a low solids content aqueous dispersion having a solids content of up to 5%, wherein the low solids content aqueous dispersion is passed across a face of a hollow fibre membrane of bore diameter greater than 1 mm at a cross flow velocity in the range of 0.5 to 5.0 m/s, and a pressure differential is applied across the hollow fibre membrane so as to force liquid from the low solids content dispersion through the membrane and to form as a retentate an aqueous dispersion of intermediate solids content, and wherein the intermediate solids content dispersion is passed across a face of a tubular membrane of bore diameter greater than that of the hollow fibre membrane but less than 50 mm at a cross flow velocity in the range of 0.5 to 5.0 m/s and a pressure differential is applied across the tubular membrane so as to force liquid from the intermediate solids content dispersion through the tubular membrane and to form as a retentate the aqueous solution of high solids content having a solids content of at least 20%, the hollow fibre membrane and tubular membrane having pore sizes of less than 3,000 Kilodaltons molecular weight cut off.

2. A process according to claim 1, wherein the hollow fibre membrane comprises first and second hollow fibre membrane modules connected in series, the low solids content dispersion delivered to the first hollow fibre membrane module is an emulsion paint slurry and has a solids content of from 1 to 5%, the retentate from the first hollow fibre module delivered to the second hollow fibre membrane module has a solids content of from 10 to 15% and the retentate from the second hollow fibre module delivered to the tubular membrane has a solids content of 20 to 30%.

3. A process according to claim 2, wherein the hollow fibre membranes of the first and second modules have a bore of from 1 to 4 mm and the cross flow velocity therein is from 0.5 to 1.5 m/s and the tubular membrane has a bore size of from 6 to 25 mm and the cross flow velocity therein is from 3.0 to 5.0 m/s.

4. A process according to claim 3, wherein the inlet pressure to the hollow fibre membrane modules is from 1.5 to 1.8 bar.

5. An apparatus for producing a high solids content aqueous dispersion from a low solids content aqueous dispersion comprising a hollow fibre membrane of bore diameter greater than 1 mm and pore size of less than 3,000 Kilodaltons molecular weight cut off, means for passing a low solids content dispersion across a face of the hollow fibre membrane at a cross flow velocity of from 0.5 to 5.0 m/s, means for applying a pressure differential across the hollow fibre membrane so as to force liquid through the membrane from a low solids content dispersion passing the membrane to form a retentate of intermediate solids content, a tubular membrane of bore diameter less than 50 mm and pore size of less than 3,000 Kilodaltons molecular weight cut off, means for passing the retentate from the hollow fibre membrane across a face of the tubular membrane at a cross flow velocity of from 0.5 to 5.0 m/s and means for applying a pressure differential across the tubular membrane so as to force liquid from an intermediate solids content dispersion passing the tubular membrane to form a retentate of high solids content.

6. An apparatus according to claim 5, wherein the hollow fibre membrane comprises first and second hollow fibre membrane modules connected in series by valve means controllable to recirculate dispersion through the first module or to deliver dispersion from the first module to the second module.

7. An apparatus according to claim 6, wherein the pore sizes of the hollow fibre membrane and the tubular membrane are in the range of from 30 to 100 Kilodaltons MWCO.

8. An apparatus according to claim 6, wherein the hollow fibre membrane and the tubular membrane are manufactured from polyarylsuphone, polyarylethersulphone, polyvinylidine fluoride, polyaryletherketone or ceramic.

9. An apparatus according to claim 6, wherein the hollow fibre membrane has a bore of from 1 to 4 mm and the tubular membrane has a bore of from 6 to 25 mm.

10. An apparatus according to claim 6, wherein the cross flow velocity in the hollow fibre membrane is from 0.5 to 1.5 m/s and the cross flow velocity in the tubular membrane is from 3.0 to 5.0 m/s.

11. An apparatus according to claim 6, comprising a centrifugal pump arranged to pump dispersion across the face of the hollow fibre membrane and a positive displacement pump arranged to pump dispersion across the face of the tubular membrane.

12. An apparatus according to claim 5, wherein the pore sizes of the hollow fibre membrane and the tubular membrane are in the range of from 30 to 100 Kilodaltons MWCO.

13. An apparatus according to claim 12, wherein the hollow fibre membrane and the tubular membrane are manufactured from polyarylsuphone, polyarylethersulphone, polyvinylidine fluoride, polyaryletherketone or ceramic.

14. An apparatus according to claim 12, wherein the hollow fibre membrane has a bore of from 1 to 4 mm and the tubular membrane has a bore of from 6 to 25 mm.

15. An apparatus according to claim 12, wherein the cross flow velocity in the hollow fibre membrane is from 0.5 to 1.5 m/s and the cross flow velocity in the tubular membrane is from 3.0 to 5.0 m/s.

16. An apparatus according to claim 12, comprising a centrifugal pump arranged to pump dispersion across the face of the hollow fibre membrane and a positive displacement pump arranged to pump dispersion across the face of the tubular membrane.

17. An apparatus according to claim 5, wherein the hollow fibre membrane and the tubular membrane are manufactured from polyarylsulphone, polyarylethersulphone, polyvinylidine fluoride, polyaryletherketone or ceramic.

18. An apparatus according to claim 17, wherein the hollow fibre membrane has a bore of from 1 to 4 mm and the tubular membrane has a bore of from 6 to 25 mm.

19. An apparatus according to claim 17, wherein the cross flow velocity in the hollow fibre membrane is from 0.5 to 1.5 m/s and the cross flow velocity in the tubular membrane is from 3.0 to 5.0 m/s.

20. An apparatus according to claim 17, comprising a centrifugal pump arranged to pump dispersion across the face of the hollow fibre membrane and a positive displacement pump arranged to pump dispersion across the face of the tubular membrane.

21. An apparatus according to claim 5, wherein the hollow fibre membrane has a bore of from 1 to 4 mm and the tubular membrane has a bore of from 6 to 25 mm.

22. An apparatus according to claim 21, wherein the cross flow velocity in the hollow fibre membrane is from 0.5 to 1.5 m/s and the cross flow velocity in the tubular membrane is from 3.0 to 5.0 m/s.

23. An apparatus according to claim 21, comprising a centrifugal pump arranged to pump dispersion across the face of the hollow fibre membrane and a positive displacement pump arranged to pump dispersion across the face of the tubular membrane.

24. An apparatus according to claim 5, wherein the cross flow velocity in the hollow fibre membrane is from 0.5 to 1.5 m/s and the cross flow velocity in the tubular membrane is from 3.0 to 5.0 m/s.

25. An apparatus according to claim 24, comprising a centrifugal pump arranged to pump dispersion across the face of the hollow fibre membrane and a positive displacement pump arranged to pump dispersion across the face of the tubular membrane.

26. An apparatus according to claim 5, comprising a centrifugal pump arranged to pump dispersion across the face of the hollow fibre membrane and a positive displacement pump arranged to pump dispersion across the face of the tubular membrane.

* * * * *